United States Patent
Itskovich

(10) Patent No.: US 7,616,001 B2
(45) Date of Patent: Nov. 10, 2009

(54) METHOD AND APPARATUS FOR BOREHOLE WALL RESISTIVITY IMAGING IN THE PRESENCE OF CONDUCTIVE MUD AND RUGOSE BOREHOLE

(75) Inventor: Gregory B. Itskovich, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 174 days.

(21) Appl. No.: 11/214,584

(22) Filed: Aug. 30, 2005

(65) Prior Publication Data
US 2007/0046291 A1    Mar. 1, 2007

(51) Int. Cl.
*G01V 3/20* (2006.01)
(52) U.S. Cl. .................................. 324/367
(58) Field of Classification Search ............. 324/347, 324/354–375
See application file for complete search history.

(56) References Cited

U.S. PATENT DOCUMENTS

| | | | | |
|---|---|---|---|---|
| 2,930,969 | A | 3/1960 | Baker | 324/10 |
| 3,365,658 | A | 1/1968 | Birdwell | 324/10 |
| 4,122,387 | A | 10/1978 | Ajam et al. | 324/10 |
| 4,468,623 | A | 8/1984 | Gianzero et al. | 324/367 |
| 4,748,415 | A | 5/1988 | Vail, III | |
| 4,794,322 | A * | 12/1988 | Davies | 324/347 |
| 5,075,626 | A * | 12/1991 | Vail, III | 324/368 |
| 5,502,686 | A | 3/1996 | Dory et al. | 367/34 |
| 6,353,322 | B1 * | 3/2002 | Tabarovsky et al. | 324/366 |
| 6,600,321 | B2 | 7/2003 | Evans | 324/369 |
| 6,714,014 | B2 | 3/2004 | Evans et al. | 324/374 |
| 7,298,147 | B2 * | 11/2007 | Benimeli et al. | 324/368 |

FOREIGN PATENT DOCUMENTS

CA    685727    5/1964

OTHER PUBLICATIONS

S. Bonner et al.; "Resistivity While Drilling—Images From the String," Oilfield Review, Spring 1996, pp. 4-19.
P. D. Williams et al.; "Analysis of a Fractured Carbonate Reservoir (Thamama Group) Using Borehole Images From an Horizontal Well, Offshore UAE," SPE 87303, 9th Abu Dhabi International Petroleum Exhibition and Conference, Abu Dhai, UAE, Oct. 15-18, 2000, pp. 1-9.

* cited by examiner

*Primary Examiner*—Kenneth J Whittington
(74) *Attorney, Agent, or Firm*—Madan & Sriram, P.C.

(57) ABSTRACT

A resistivity imaging tool is used in a borehole having a conductive fluid. Second differences between axially spaced apart electrodes are used in the imaging. A calibration compensates for the effects of borehole rugosity.

19 Claims, 9 Drawing Sheets

METHOD AND APPARATUS FOR BOREHOLE WALL RESISTIVITY IMAGING IN THE PRESENCE OF CONDUCTIVE MUD AND RUGOSE BOREHOLE

BACKGROUND OF THE INVENTION

1. Field of the Invention

This invention generally relates to exploration for hydrocarbons involving electrical investigations of a borehole penetrating an earth formation. More specifically, this invention relates to highly localized borehole investigations employing the introduction and measuring of individual survey currents injected into the wall of a borehole by capacitive coupling of electrodes on a tool moved along the borehole with the earth formation.

2. Background of the Art

Electrical earth borehole logging is well known and various devices and various techniques have been described for this purpose. Broadly speaking, there are two categories of devices used in electrical logging devices. In the first category, a measure electrode (current source or sink) are used in conjunction with a diffuse return electrode (such as the tool body). A measure current flows in a circuit that connects a current source to the measure electrode, through the earth formation to the return electrode and back to the current source in the tool. In inductive measuring tools, an antenna within the measuring instrument induces a current flow within the earth formation. The magnitude of the induced current is detected using either the same antenna or a separate receiver antenna. The present invention belongs to the first category.

There are several modes of operation of prior art devices: in one, the current at the measuring electrode is maintained constant and a voltage is measured while in the second mode, the voltage of the electrode is fixed and the current flowing from the electrode is measured. Ideally, it is desirable that if the current is varied to maintain constant the voltage measured at a monitor electrode, the current is inversely proportional to the resistivity of the earth formation being investigated. Conversely, it is desirable that if this current is maintained constant, the voltage measured at a monitor electrode is proportional to the resistivity of the earth formation being investigated. Ohm's law teaches that if both current and voltage vary, the resistivity of the earth formation is proportional to the ratio of the voltage to the current.

Birdwell (U.S. Pat. No. 3,365,658) and Ajam et al (U.S. Pat. No. 4,122,387) each provide background for this disclosure.

Techniques for investigating the earth formation with arrays of measuring electrodes have been proposed. See, for example, the U.S. Pat. No. 2,930,969 to Baker, Canadian Patent No. 685727 to Mann et al., U.S. Pat. No. 4,468,623 to Gianzero, and U.S. Pat. No. 5,502,686 to Dory et al. and U.S. Pat. No. 6,714,014 to Evans et al, each of which provide additional background information to this disclosure.

In the prior art devices, current is actively focused in the direction perpendicular to the borehole wall. There is a technical challenge to provide stable focusing conditions during the logging at high temperature and high pressure conductive borehole environment. As soon as the focusing conditions are not met, the measurements are responsive to a considerable extent to the properties of the mud. The prior art devices do not specifically address the problems due to irregularities in the wall surface of the wellbore. If the wall of the wellbore is irregular, the measuring current path becomes distorted and the relationship between measured impedance and earth formation resistivity changed as result.

SUMMARY OF THE INVENTION

One embodiment of the invention is a method of evaluating an earth formation. The method includes using a resistivity sensor conveyed in a rugose borehole to make first measurements responsive at least in part to the rugosity, the first set of measurements being made at a plurality of different circumferential positions in the borehole. Second measurements indicative of a property of the earth formation are made with the sensor at substantially the same positions as the first measurements. The property of the earth formation is determined from the second measurements, the determination being based at least in part on a correction for the rugosity determined from the first measurements. The first measurements may involve conveying a measure current into the formation and measuring a voltage difference between each pair of two pairs of electrodes on the sensor. Determination of the property of the earth formation may be based on making the second measurements using a correction for rugosity determined from the first measurements and then determining a second difference of the measurements. Determination of the property may also be done using a processor which determines a calibrated second difference of the second measurements using a calibration factor determined from the first measurements. The property of the formation may be a resistivity image.

Another embodiment of the invention is an apparatus for evaluating an earth formation. The apparatus includes a resistivity sensor conveyed in a rugose borehole in the earth formation. The sensor includes at least one current electrode which conveys a measure current into the formation and an array of axially distributed measure electrodes. The apparatus also include circuitry which determines the property of the earth formation from a first set of circumferentially distributed measurements made by the array of measure electrodes that are responsive to the rugosity and from a second set of circumferentially distributed measurements that are indicative of the property of the formation. The circuitry may include a processor which uses a second difference between the first measurements. The circuitry may include a processor which uses a second difference between the second measurements. The circuitry which determines the property may adjust the second difference between the second measurements using the second difference between the first measurements. The sensor may be conveyed in the earth formation using a wireline, a drilling tubular and/or a slickline. The circuitry may be at a surface location or a downhole location. The apparatus may include at least one non-conductive pad which carries an array of measure electrodes. The apparatus may include more than one non-conductive pad extending from a body of a logging tool. The borehole may have a conducting fluid.

Another embodiment of the invention is a computer readable medium for use with an apparatus for evaluating an earth formation. The apparatus includes a resistivity sensor conveyed in a rugose borehole, the sensor including at least one current electrode which conveys a measure current into the formation and an array of circumferentially and axially distributed measure electrodes. The medium includes instructions that enable a processor to determine a property of the earth formation from a first set of circumferentially distributed measurements made by the array of measure electrodes, the first set of measurements responsive to the rugosity, and from a second set of circumferentially distributed measurements made by the array of measure electrodes, the second set of measurements indicative of the property of the earth formation. The medium may include a ROM, an EPROM, an EAROM, a flash memory and/or an optical disk.

BRIEF DESCRIPTION OF THE FIGURES

The present invention is best understood with reference to the accompanying figures in which like numerals refer to like elements and in which.

DETAILED DESCRIPTION OF THE INVENTION

Figure 1:
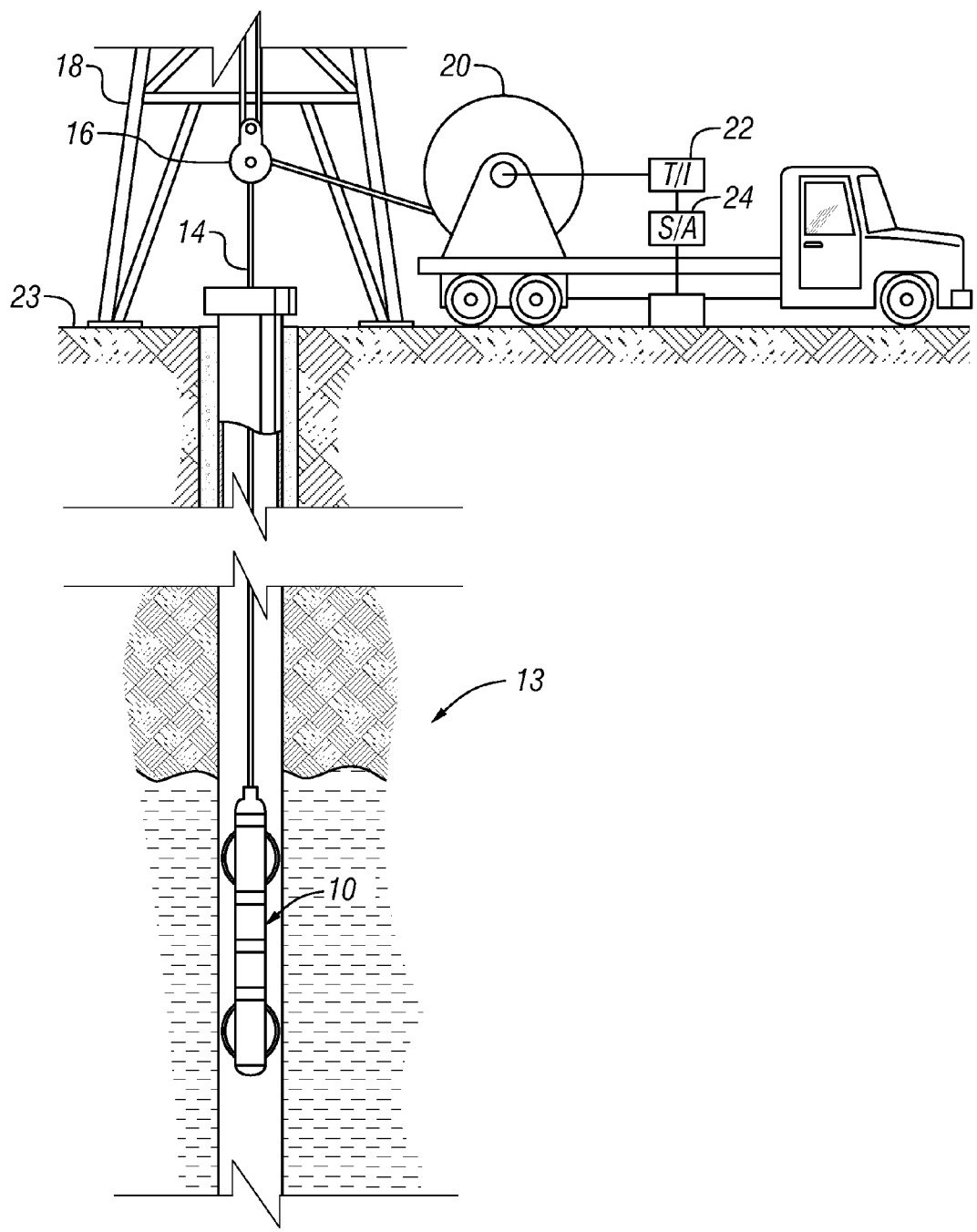
FIG. 1 shows an exemplary logging tool suspended in a borehole.

FIG. 1 shows an imaging tool 10 suspended in a borehole 12, that penetrates earth formations such as 13, from a suitable cable 14 that passes over a sheave 16 mounted on drilling rig 18. The cable 14 includes a stress member and seven conductors for transmitting commands to the tool and for receiving data back from the tool as well as power for the tool. The tool 10 is raised and lowered by draw works 20. Electronic module 22, on the surface 23, transmits the required operating commands downhole and in return, receives data back which may be recorded on an archival storage medium of any desired type for concurrent or later processing. The data may be transmitted in analog or digital form. Data processors such as a suitable computer 24, may be provided for performing data analysis in the field in real time or the recorded data may be sent to a processing center or both for post processing of the data.

Figure 2A:
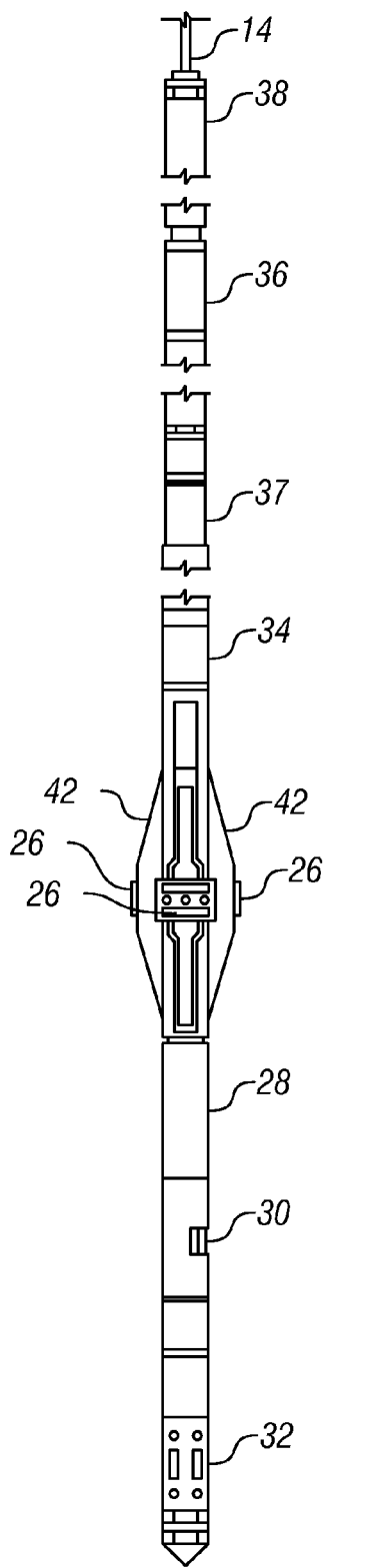
FIG. 2A is a mechanical schematic view of an exemplary imaging tool.

FIG. 2a is a schematic external view of a borehole sidewall imager system. The tool 10 comprising the imager system includes resistivity arrays 26. Optionally, the imager system may include other sensors, such as a mud cell 30 or a circumferential acoustic televiewer 32. Electronics modules 28 and 38 may be located at suitable locations in the system and not necessarily in the locations indicated. The components may be mounted on a mandrel 34 in a conventional well-known manner. The outer diameter of the assembly may be about 5 inches and about fifteen feet long. An orientation module 36 including a magnetometer and an accelerometer or inertial guidance system may be mounted above the imaging assemblies 26 and 32. The upper portion 38 of the tool 10 contains a telemetry module for sampling, digitizing and transmission of the data samples from the various components uphole to surface electronics 22 in a conventional manner. If acoustic data are acquired, they are preferably digitized, although in an alternate arrangement, the data may be retained in analog form for transmission to the surface where it is later digitized by surface electronics 22.

Figure 2B:
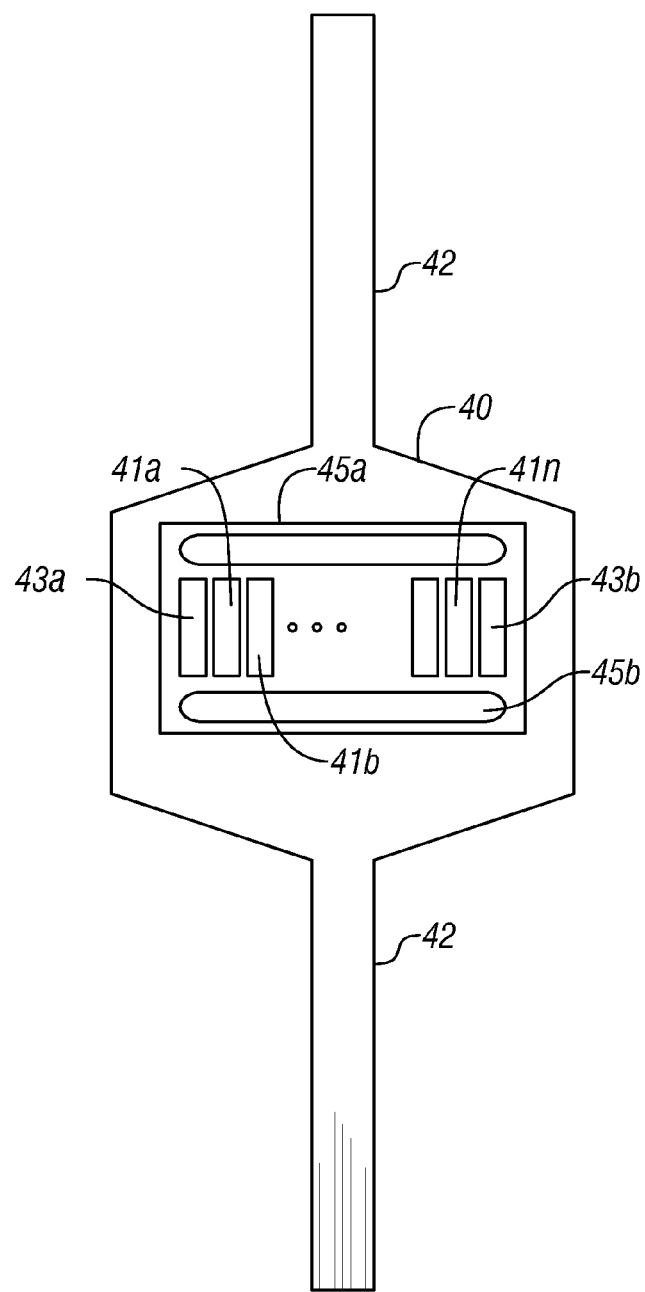
FIG. 2B is a detail view of an electrode pad of an exemplary logging tool.

Also shown in FIG. 2A are three resistivity arrays 26 (a fourth array is hidden in this view. Referring to FIGS. 2A and 2B, each array includes measure electrodes 41a, 41b ... 41n for injecting electrical currents into the formation, focusing electrodes 43a, 43b for horizontal focusing of the electrical currents from the measure electrodes and focusing electrodes 45a, 45b for vertical focusing of the electrical currents from the measure electrodes. By convention, "vertical" refers to the direction along the axis of the borehole and "horizontal" refers to a plane perpendicular to the vertical.

The method of the present invention is based on results that follow from a solution of Laplace's equation. If the electrodes are centered and the borehole and formation have axial symmetry, the measured electric potential also has axial symmetry and satisfies the two-dimensional Laplace's equation. To characterize an axially-symmetric electric field, a cylindrical coordinate system is used in which the potential U depends on two coordinates (z, r) and does not change in the azimuthal direction. It is desirable to derive the asymptotic representation for the electric potential U(r, z) inside the borehole in terms of the potential and its derivatives at the axis of symmetry U (z)=U (0, z).

Laplace's equation for cylindrical coordinates is:

$$\frac{\partial^2 U}{\partial z^2} + \frac{1}{r}\frac{\partial U}{\partial r} + \frac{\partial^2 U}{\partial r^2} = 0, \tag{1}$$

in the form of a Taylor's series with respect to the radial coordinate, r, $$U(r,z)=U_0(z)+U_2(z)r^2+U_4(z)r^4+ \tag{2}$$

Due to azimuthal symmetry, the series contains only the even powers of the radial coordinate r. The first term in eqn. (2) corresponds to the potential distribution along the axis of symmetry (r=0). By substituting the eqn. (2) into eqn. (1), it can be seen that, $$U_0''(z)+4U_2(z)+[U_2''(z)+16U_4(z)]r^2+[U_4''(z)+36U_6(z)]r^4+ =0 \tag{2a}$$

where prime stands for a differentiation with respect to the vertical coordinate z. Since eqn. (2) must be satisfied for an arbitrary value of r, the coefficients of the series must be equal to zero, which yields to the following equations:

$$U_2(z) = -\frac{1}{4}U_0''(z),\ U_4(z) = -\frac{1}{64}U_0''(z), \tag{3}$$

or in a more generalized form, $$U_{2k} = (-1)^k \frac{U_0^{2k}(z)}{2^{2k}(k!)^2} \tag{4}$$

From Eqns. (3) and (4), one may obtain the potential distribution near the axis of symmetry as:

$$U(r, z) = U_0(z) - \frac{1}{4}U_0''(z)r^2 + \frac{1}{64}U_0''''(z)r^4 - \ldots \quad (5)$$

Eqn. (5) makes it possible to calculate the potential inside the borehole $U(r, z)$ through the potential distribution of potential and potential derivatives along the axis $U_0(0, z)$.

In case of a conductive mud with relatively high-resistivity contrast ($R_t/R_m$ greater than about 1000) between the borehole and formation, it is possible to keep only the first two terms in Eqn. (5) and derive a simple asymptotic expression for the potential distribution inside the borehole, $$U(r, z) \approx U_0(z) - \frac{1}{4}U_0''(z)r^2. \quad (6)$$

Taking the derivative with respect to variable r in Eqn (6), provides an estimate of the radial electric field $E_r$ inside the borehole, $$E_r = -\frac{\partial U}{\partial r} \approx \frac{1}{2}U_0''(z)r, \quad (7)$$

and the radial current density inside the borehole, $$j_r(r) = \sigma_m E_r(r) \approx \frac{\sigma_m}{2}U_0''(z)r, \quad (8)$$

where $\sigma_m$ is the conductivity of the borehole fluid.

It will be appreciated by those skilled in the art that resistivity is the inverse of conductivity. Accordingly, any reference in this disclosure to resistivity should be considered to include disclosure as to conductivity inverted. Similarly, any reference in this disclosure to conductivity should be considered to include disclosure as to the resistivity inverted. Those skilled in the art will easily appreciate that substitution of resistivity for conductivity (or vise-versa) may be made in any of the equations in this specification, all falling within the bounds of the invention.

Because the current density $j_f$ in the formation at the borehole wall must be equal to the current density $j_r$ inside the borehole at the borehole wall Eqns. (7) and (8) establish the following asymptotic relation between the second difference in the center of the borehole and the radial current flowing into formation $$U_0''(z) = \frac{2}{r_b \sigma_m} j_f \quad (9)$$

where $r_b$ is the borehole radius. It follows from Eqn. (9) that the second-potential difference $U_0''(z)$ measured inside the borehole is directly proportional to the current leakage into the formation $j_f$. In turn, the current density in the formation is inversely proportional to the formation resistivity in the vicinity of borehole wall.

Figure 3:
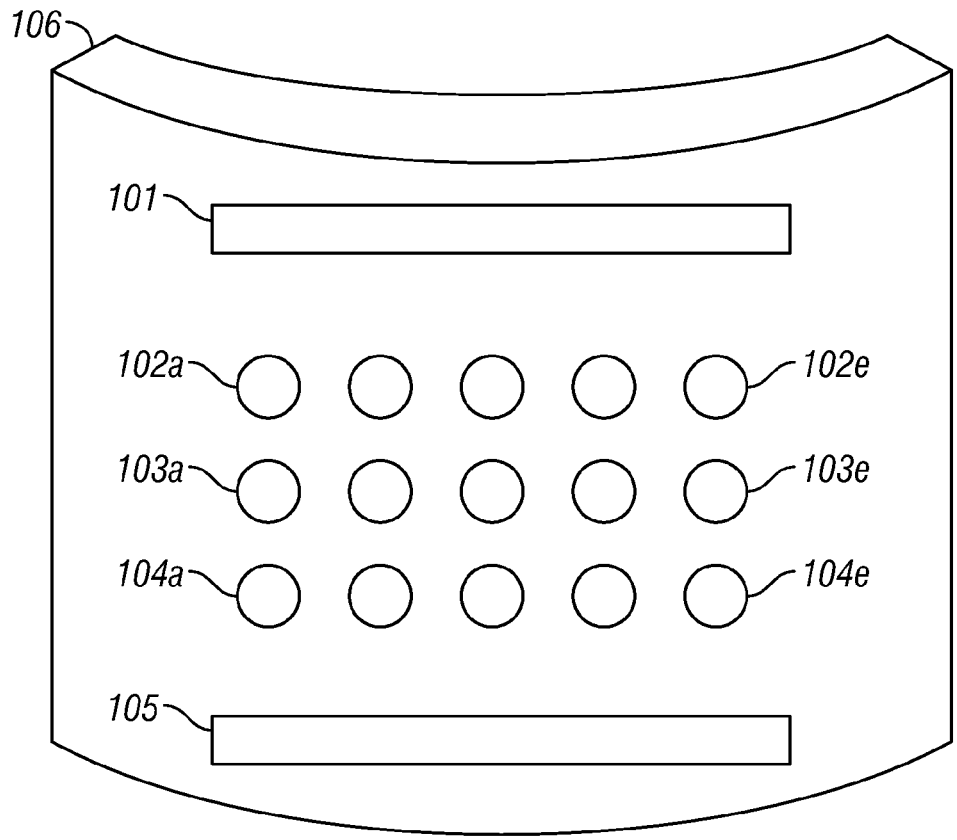
FIG. 3 shows non-conductive pad with current, return and measurement electrodes mounted on the pad.

Turning now to FIG. 3, a suitable configuration of electrodes on a pad 106 of a logging tool is shown. Those skilled in the art will appreciate that the configuration of electrodes on a pad may vary and is, to a certain extent, a matter of design choice. Accordingly, the configuration outlined here is exemplary of an embodiment of the invention and not the sole embodiment contemplated. The current and return electrodes are denoted by 101 and 105. A series of measurement buttons ($102_a$-$102_e$), ($103_a$-$103_e$) and ($104_a$-$104_e$) are used. The method operates in two different modes. In the first (calibration) mode, current is injected into through electrode 101 and returns through the electrode 105 (or vice versa, injected through 105 and returned through 101). Voltage differences are measured between first pairs of electrodes $102_a$ and $103_a$, $102_b$ and $103_b$, $102_c$ and $103_c$, $102_d$ and $103_d$, $102_e$ and $103_e$ and between second pairs of electrodes $103_a$ and $104_a$, $103_b$ and $104_b$, $103_c$ and $104_c$, $103_d$ and $104_d$, $103_e$ and $104_e$. The measurements made in the calibration mode may be considered to be a first set of measurements made by the logging tool. It should be noted that the use of five columns and three rows of electrodes is for exemplary purposes only: more or fewer electrodes may be used.

The voltage differences between the first and second pairs of electrodes provide a calibration that is then applied to the main measurements made below. The voltage differences between the first and second pairs of electrodes during calibration may be adjusted so that the differences are nulled. The calibration might be done either numerically or in a hardware (described below). The same settings are then used for the main measurements to provide corrected measurements. Details of circuitry for performing the nulling are shown in Tabarovsky. For the purposes of the present invention, the term "calibration factor" refers to the result of either method of determining the correction factor to be applied.

Figure 12:
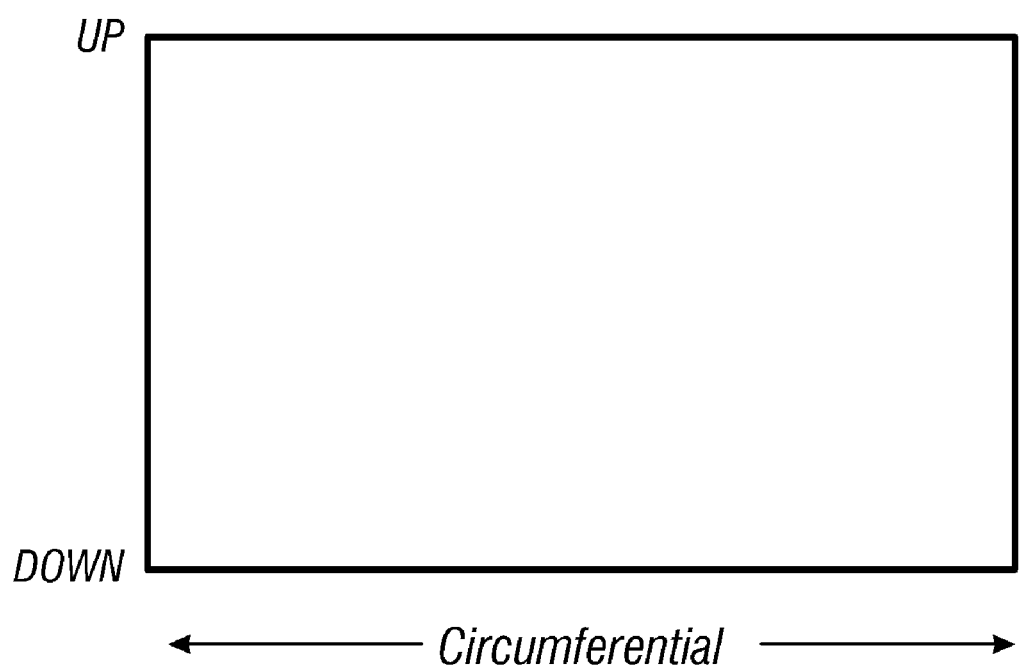
FIG. 12 shows an exemplary layout of a borehole resistivity image.

After the calibration, the second (main) mode measurements are made. In the second (main) mode, the electrical current is injected from either 101 or 105, and is returned to an electrode at a distant location on the other side of the measure electrodes from the injection electrode. The return could be at the earth's surface or other physically distant location. Measuring the voltage differences between the pairs of electrodes is repeated. A difference of the voltage differences is then determined. The difference of voltage difference is directly related to current leakage into the earth formation, and this current leakage determination is substantially unaffected by irregularities in the wall of the wellbore when the calibration correction (discussed above) is applied to define the difference of voltage differences. As discussed above, the current leakage is directly related to the conductivity of the earth formations. By making measurements of current leakage measurements taken from a plurality of pads (in one embodiment, at least 4 pads are used), it is possible to generate a borehole resistivity image which is substantially unaffected by the irregularities of the borehole wall. As would be known to those versed in the art, an exemplary borehole resistivity image (without any actual data being shown) has the appearance shown in FIG. 12. The abscissa is the circumference of the borehole and the ordinate is the depth.

Figure 4A:
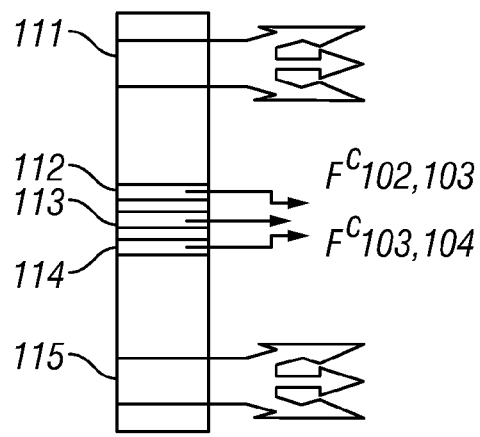
FIGS. 4A, 4B shows the tool model used to perform 2D modeling of the calibration and measurement modes of the present invention.
Figure 4B:
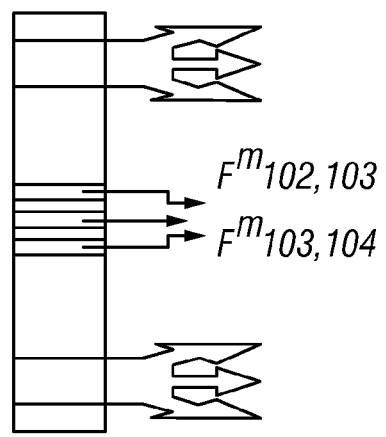

The validity of the invention is illustrated by the means of 2D mathematical modeling. A simplified model of the electrode configuration used for modeling is shown in FIGS. 4a, 4b. The injection, return and measurement electrodes are represented as conductive rings 111, 115, 112, 113, 114 mounted on the isolated mandrel. For purposes of the model, the diameter of the rings is assumed to be 7.5 in (19.05 cm). The width of both injection and return electrodes is assumed to be 1 in (2.54 cm), while width of the measurement electrodes is presumed at 0.25 in (0.63 cm). The spacing between measurement electrodes is also assumed at 0.25 in (0.63 cm).

The calibration factor K is given by the ratio $$K = \frac{F^c_{102,103}}{F^c_{103,104}}$$

where F refers to the voltage, the subscripts refer to the terminal pairs and the superscript c refers to measurements made during calibration. The second difference $S_{234}$ in the main phase is then given by $$S_{234} = F_{102,103}^m - K F_{103,104}^m.$$

This calibration factor may be applied numerically by a processor or may be implemented by circuitry which automatically modifies the voltages and or currents.

Figure 5:
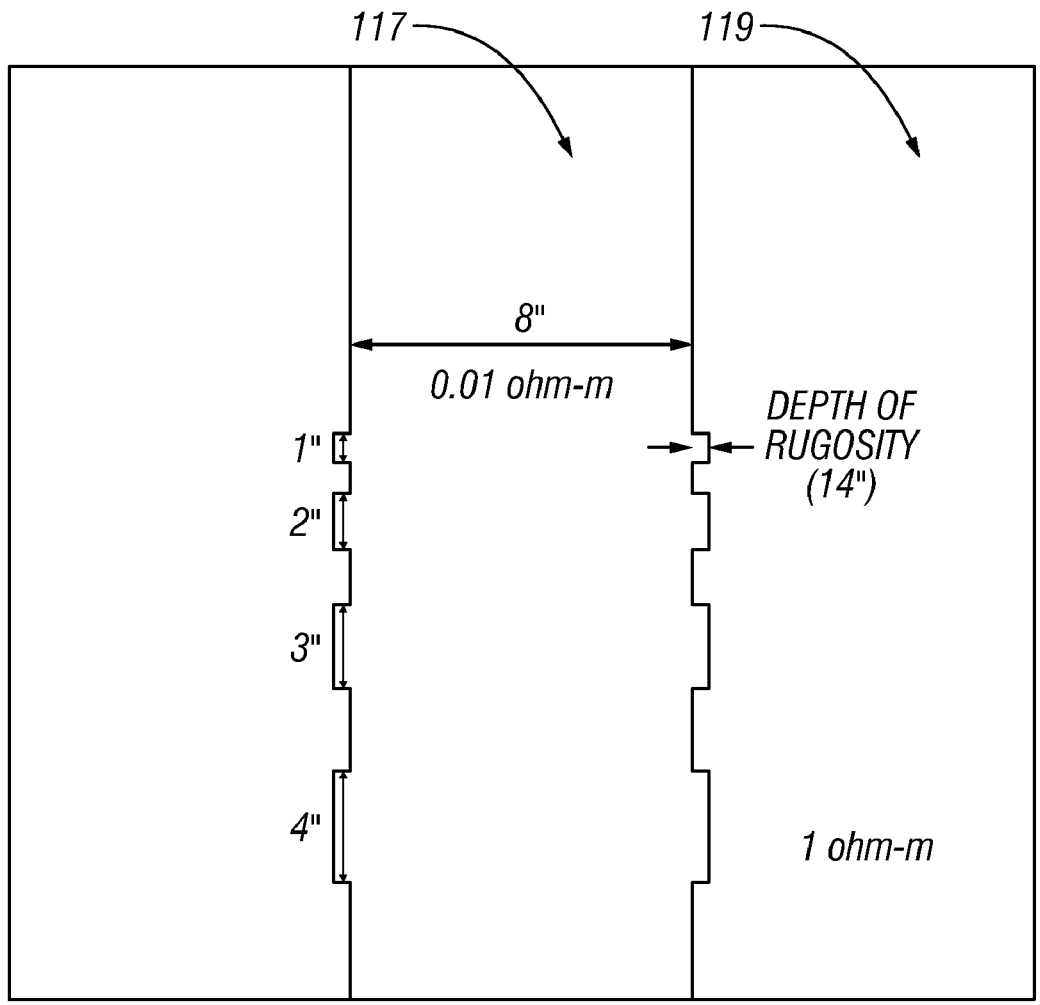
FIG. 5 shows a homogeneous formation model in the presence of irregularities in the borehole shape.

The borehole for the model as shown in FIG. 5 is 8 in (20.32 cm) in diameter and is assumed filled with 0.01 Ω-m mud. The borehole is rugose, and the depth of the rugosity is, for discussion purposes, 0.25 in (0.63 cm). It is assumed that the thickness of the rugose regions varies between 1 to 4 inches (2.54 cm-10.16 cm). For the purposes of this invention, the "rugosity" is considered to be any irregularity of the borehole wall and may be of any size, shape or depth. When the borehole contains a conductive mud, the model shown in FIGS. 4a, 4b is a reasonable approximation of a logging tool that has several pad mounted electrodes.

Two formation models are illustrated. The first model (shown in FIG. 5) represents a rugose borehole 117 surrounded by homogeneous 1 Ω-m formation 119. The second model (shown in FIG. 6) is the rugose borehole 117' surrounded by a layered formation 119' with the resistivity alternating between 1 and 10 Ω-m.

Figure 7:
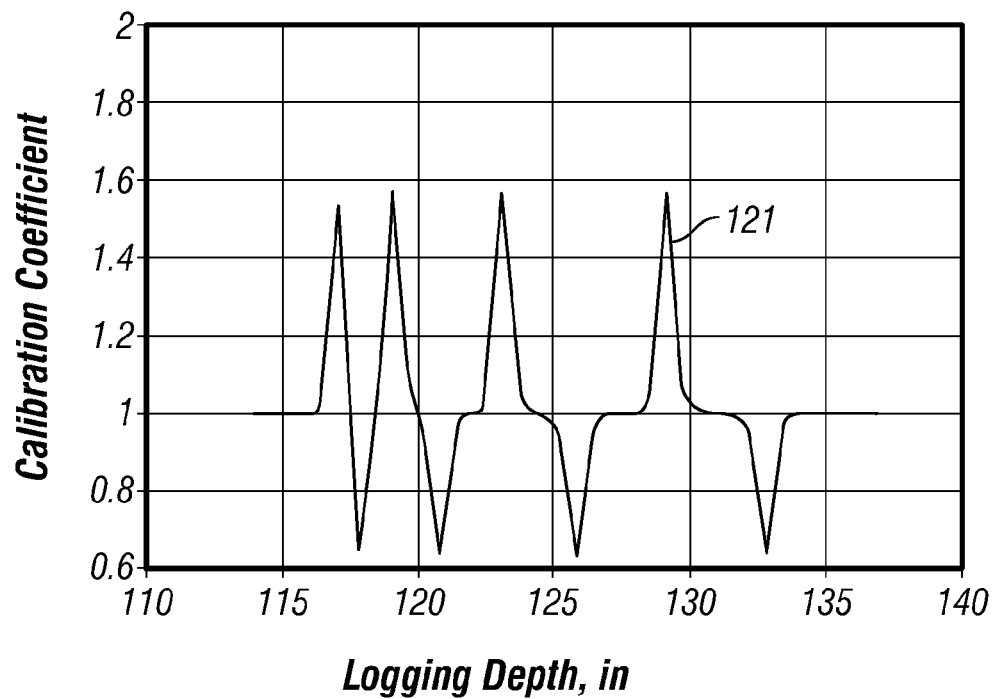
FIG. 7 shows the variation of the calibration coefficient along the borehole wall for the model of FIG. 4.
Figure 8:
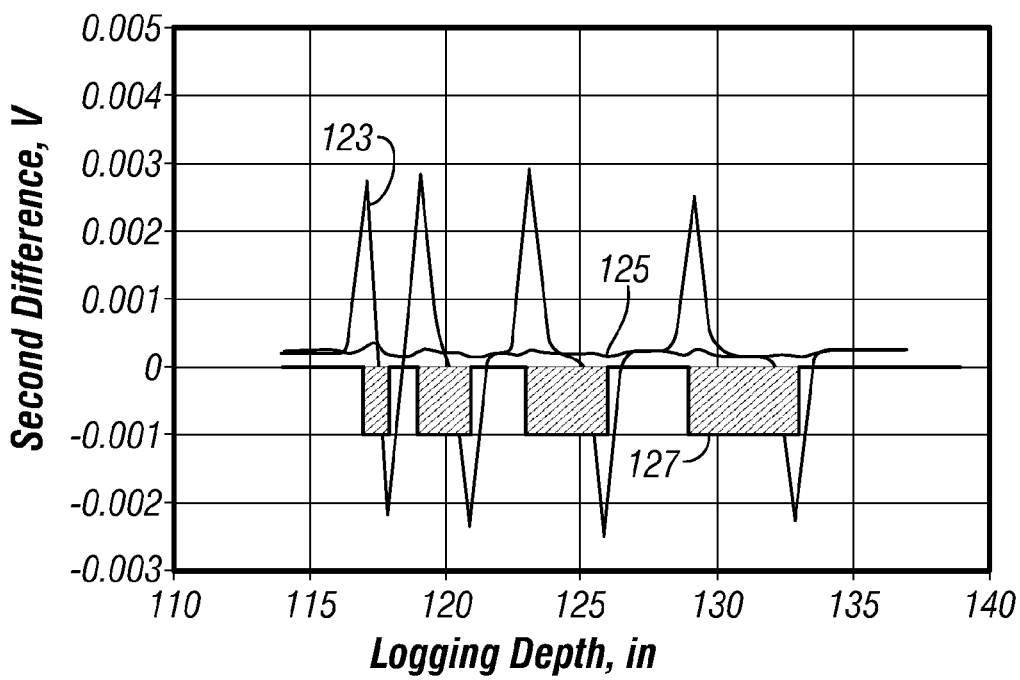
FIG. 8 shows result of application of the calibration coefficient to the data corresponding to the model of FIG. 4.

FIG. 7 shows the variation of the calibration coefficient 121 along the borehole wall in case of the model of FIG. 5. The abscissa is the depth while the ordinate is the calibration coefficient. FIG. 8 represents result of application 125 of the determined calibration coefficient 121 to the uncalibrated second difference signal 121. As can be seen, after the calibration is applied, the corrected signal 125 is essentially flat, as it should be in the homogenous formation model of FIG. 5. Also shown in FIG. 8 is a curve 137 representing the borehole rugosity.

As noted above, the calibration may be applied numerically by a processor or may be implemented in an analog or digital manner by adjusting the currents and/or voltages during the calibration. In any case, the calibration determination and application may be done separately for each depth.

Figure 6:
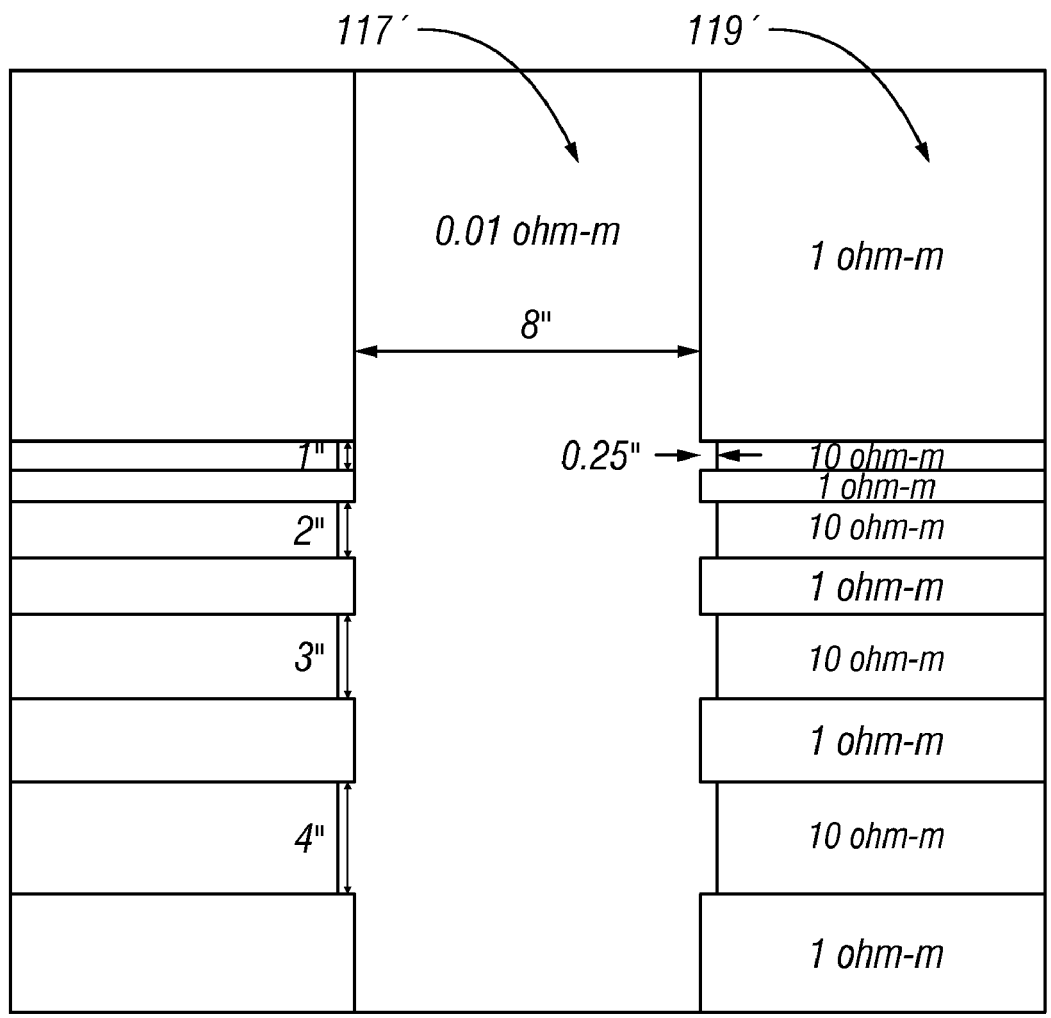
FIG. 6 shows a layered formation model in the presence of irregularities in the borehole shape.
Figure 9:
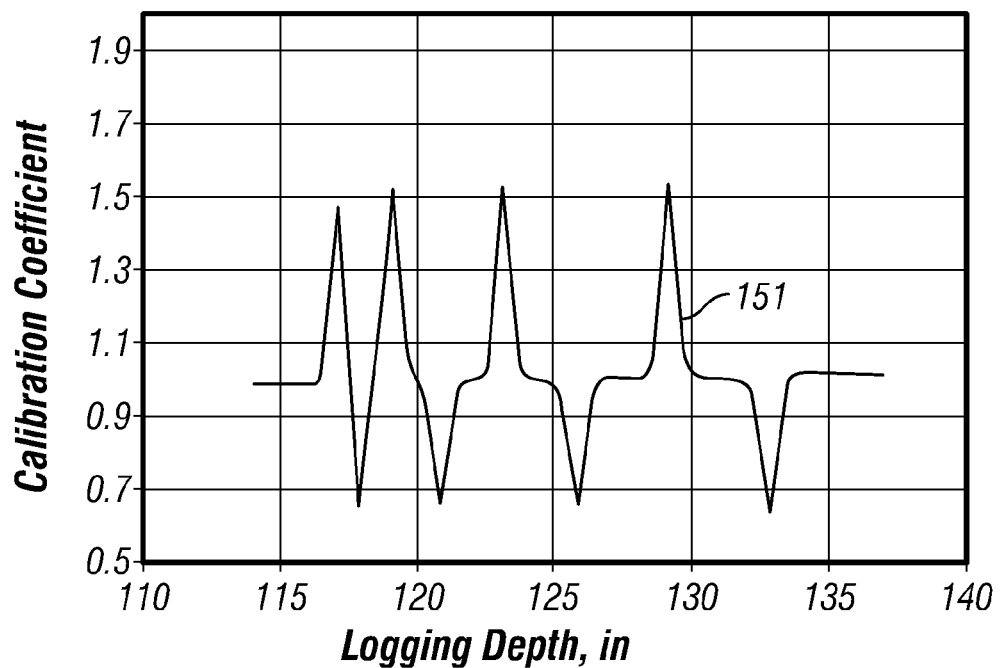
FIG. 9 shows the variation of the calibration coefficient along the borehole wall for the model of FIG. 5.
Figure 10:
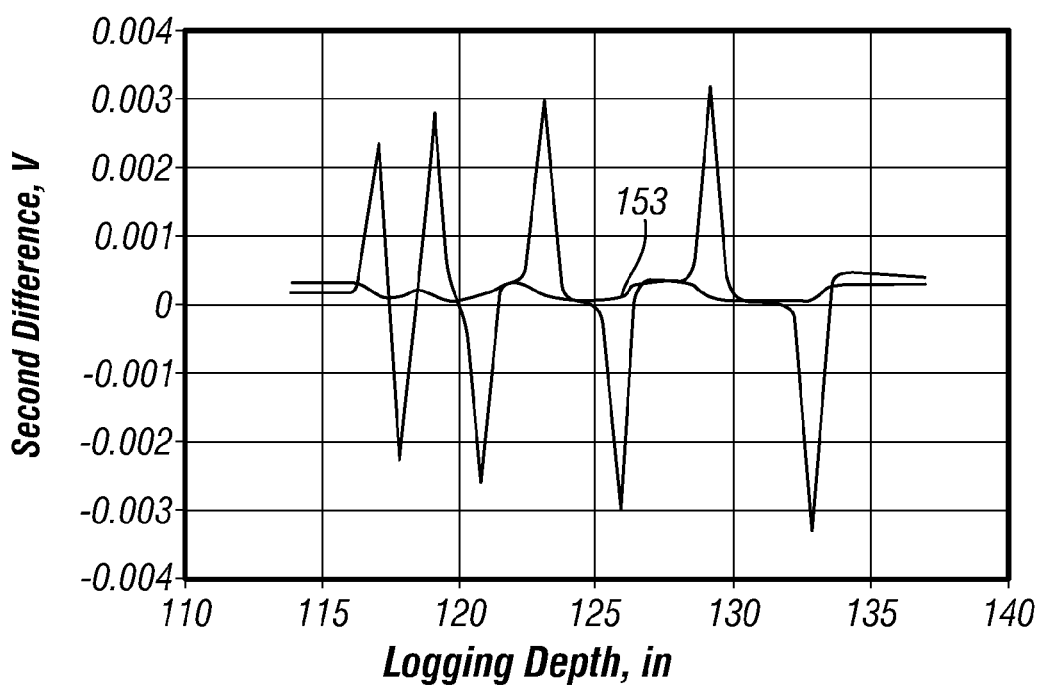
FIG. 10 shows result of application of the calibration to the data corresponding to the model of FIG. 5.
Figure 11:
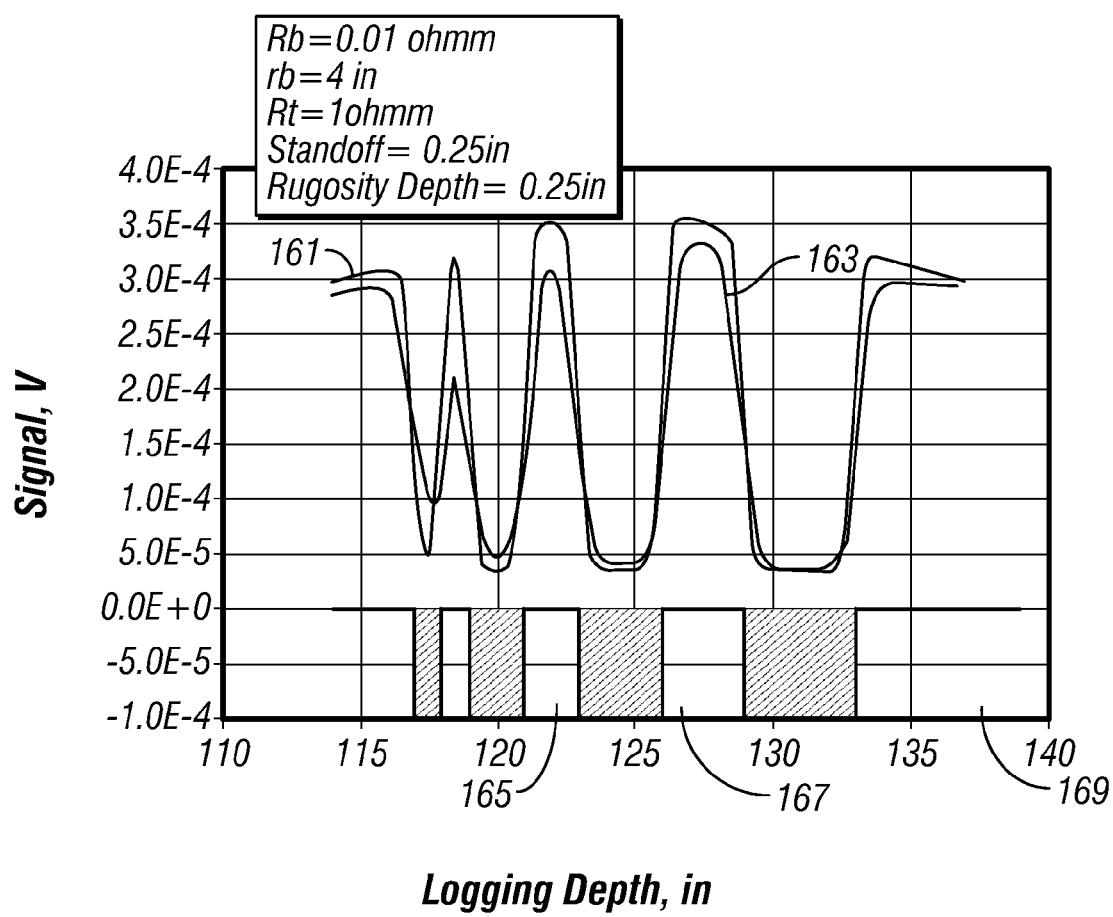
FIG. 11 shows a comparison between signals simulated for the both rugose and smooth borehole shape for the model of FIG. 5.

A similar result is obtained in the layered formation of FIG. 6. FIG. 9 shows the calibration coefficient 151 found during calibration mode for the model. FIG. 10 shows the result 155 of application of the calibration to the signal 155 acquired in the main mode. As can be seen in FIG. 10, in the case of a complicated formation model and a rugose borehole, the calibration still effectively suppresses the influence of borehole irregularities. This point is also illustrated by FIG. 11 which shows a comparison between the calibrated second difference signal 163 for the layered model of FIG. 5 and the signal 163 for the same model for a smooth borehole with no rugosity. The match between two curves deteriorates with reduction of the thicknesses of the layers but for layers 165, 167, 169 with a thickness of 2 in (5.08 cm) or more, the corrected second difference is very close to the signal in the absence of the irregularities in the borehole.

The invention has further been described by reference to logging tools that are intended to be conveyed on a wireline. However, the method of the present invention may also be used with measurement-while-drilling (MWD) tools, or logging while drilling (LWD) tools, either of which may be conveyed on a drillstring or on coiled tubing. Further, the invention may be adapted to be conveyed on a slickline, as will be evident to one skilled in the art. An example of a resistivity imaging tool for MWD use is disclosed in U.S. Pat. No. 6,600,321 to Evans, having the same assignee as the present invention, the contents of which are incorporated herein by reference.

The processing of the data may be done with the use of a computer program implemented on a suitable machine readable medium that enables the processor to perform the control and processing. The term processor as used in this application is used in its traditionally-broad sense and is intended to include such devices as single-core computers, multiple-core computers, distributed computing systems, field programmable gate arrays (FPGAs) and the like. The machine readable medium referenced in this disclosure is any medium that may be read by a machine and may include magnetic media, RAM, ROM, EPROM, EAROM, flash memory and optical disks. The processing may be done downhole or at the surface. In an alternative embodiment, part of the processing may be done downhole with the remainder conducted at the surface.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. A method of evaluating an earth formation, the method comprising:
    (a) using a resistivity sensor including a two-dimensional array of pad mounted electrodes conveyed in an open borehole to make first measurements in a circumferential direction responsive at least in part to borehole rugosity;
    (b) making second measurements with the sensor, the second measurements being made at substantially the same positions as the first measurements; and
    (c) producing from first measurements and the second measurements a borehole image of a resistivity property.

2. The method of claim 1 wherein making the first measurements further comprises:
    (i) conveying a measure current into the formation, and
    (ii) measuring a voltage difference between each pair of two pairs of electrodes on the sensor.

3. The method of claim 1 wherein producing the borehole image of the resistivity property further comprises:
    (i) making the second measurements using a correction for the rugosity determined from the first measurements; and
    (ii) determining a second difference of the second measurements.

4. The method of claim 1 wherein producing the borehole image of the resistivity property further comprises:
    (i) using a processor for determining a calibrated second difference of the second measurements, the processor using a calibration factor determined from the first measurements.

5. The method of claim 1 wherein the determination is based at least in part on a correction for the rugosity determined from the first measurements.

6. The method of claim 1 wherein producing the borehole image of the resistivity property further comprises using a second difference of the first measurements and a second difference of the second measurements.

7. The method of claim 1 further comprising performing (a)-(c) in a borehole having a conductive fluid therein.

8. An apparatus for evaluating an earth formation, the apparatus comprising:
   (a) a resistivity sensor configured to be conveyed in a rugose open borehole, the sensor including at least one current electrode and a two-dimensional array of measure electrodes mounted on a pad; and
   (b) circuitry configured to determine a borehole image of a resistivity property using:
      (A) a first set of measurements in a circumferential direction made by the array of measure electrodes, the first set of measurements responsive to the rugosity, and
      (B) a second set of measurements different from the first set of measurements made by the array of measure electrodes made at substantially the same positions as the first set, the second set of measurements indicative of the property of the earth formation.

9. The apparatus of claim 8 wherein the circuitry which determines the property comprises a processor is further configured to use a second difference between the second measurements.

10. The apparatus of claim 9 wherein the circuitry configured to determine the property is further configured to adjust the second difference between the second measurements using the first difference between the first measurements.

11. The apparatus of claim 9 wherein the circuitry is at one of (i) a surface location, and (ii) a downhole location.

12. The apparatus of claim 8 wherein the circuitry which determines the property comprises a processor configured to use a first difference between the first measurements.

13. The apparatus of claim 8 further comprising at least one pad configured to carry the array of measure electrodes.

14. The apparatus of claim 13 wherein the at least one pad further comprises a plurality of pads configured to be extended from a body of a logging tool.

15. The apparatus of claim 8 wherein the borehole is filled with a conductive fluid.

16. The apparatus of claim 8 wherein the sensor is configured to be conveyed in the earth formation on one of (i) a wireline, (ii) a drilling tubular, and (iii) a slickline.

17. The apparatus of claim 8 wherein the circuitry is configured to make the determination based at least in part on a correction for the rugosity determined from the first measurements.

18. A computer readable medium product having stored thereon instructions that when read by a processor cause the processor to execute a method, the method comprising:
   producing a borehole image of a resistivity property of an earth formation using
   a first set of measurements in a circumferential direction made by a two dimensional array of pad mounted electrodes in a borehole, the first set of measurements responsive to a rugosity of the borehole, and
   a second set of measurements made by the array of measure electrodes made at substantially the same positions as the first set, the second set of measurements different from the first measurements and indicative of the property of the earth formation.

19. The medium of claim 18 further comprising at least one of (i) a ROM, (ii) an EPROM, (iii) an EAROM, (iv) a flash memory, and (v) an optical disk.

* * * * *